Sheet 2-2 Sheets.

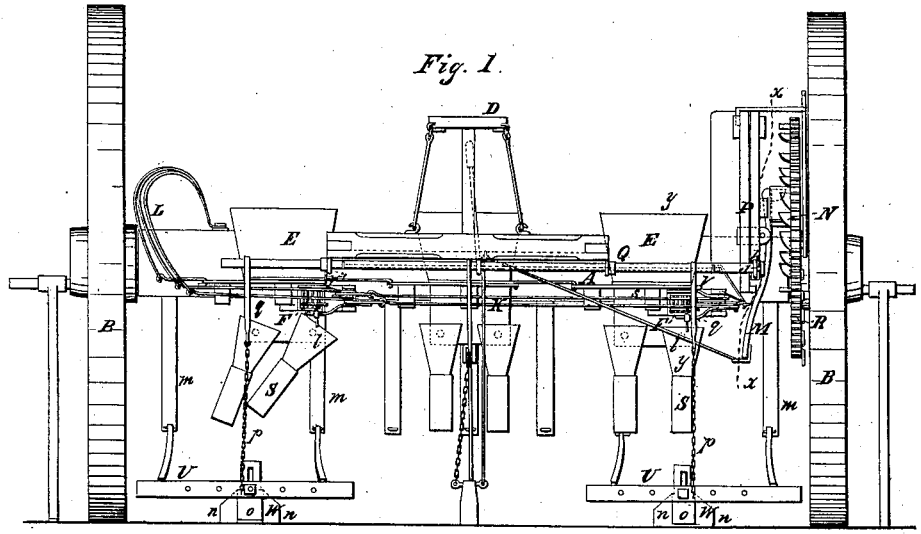
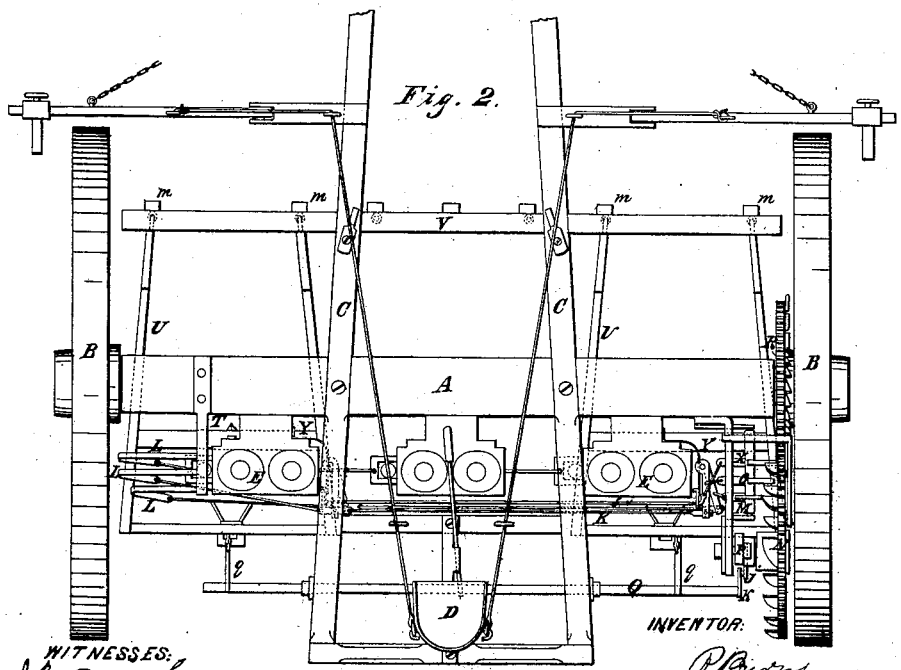

R. Burns.
Corn Planter.

Nº 48,664.        Patented Jan. 11, 1866.

WITNESSES:        INVENTOR:

UNITED STATES PATENT OFFICE.

ROBERT BURNS, OF NEW YORK, N. Y.

IMPROVEMENT IN CORN-PLANTERS.

Specification forming part of Letters Patent No. 48,652, dated July 11, 1865.

*To all whom it may concern:*

Be it known that I, ROBERT BURNS, of the city, county, and State of New York, have invented a new and Improved Corn-Planter; and I do hereby declare that the following is a full, clear, and exact description thereof, which will enable others skilled in the art to make and use the same, reference being had to the accompanying drawings, forming part of this specification, in which—

Figure 3:
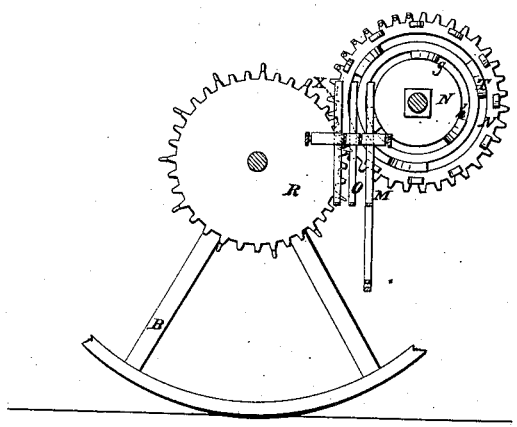
Figure 4:
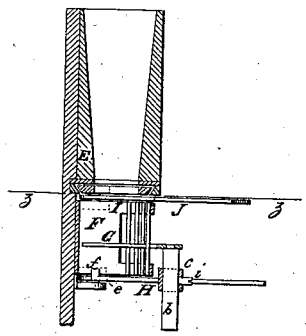
Figure 5:
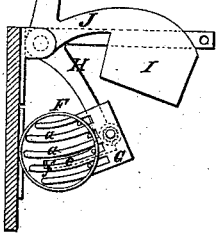

Figure 1, Sheet No. 1, is a rear view of my invention; Fig. 2, a plan or top view of the same. Fig. 3, Sheet No. 2, is an enlarged section of the same, taken in the line $x\ x$, Fig. 1. Fig. 4 is an enlarged section of the same, taken in the line $y\ y$, Fig. 1; Fig. 5, an enlarged section of the same, taken in the line $z\ z$, Fig. 4.

Similar letters of reference indicate like parts.

This invention relates to a new and improved corn-planter for planting corn in hills and in check-rows; and it consists in a novel construction of the seed-distributing device, as hereinafter fully shown and described, whereby the quantity of seed in each dropping may be varied as desired, the device prevented from choking or clogging, and the seed-distributing apparatus rendered inoperative whenever desired—as, for instance, in drawing the machine from place to place, turning at the ends of rows, &c.

A represents an axle, having a wheel, B, at each end of it, and two thills, C C, attached, which extend beyond the rear of the axle and have the driver's seat D attached.

E represents seed-boxes, which are secured to the rear side of the axle A. Any number of these seed-boxes may be used; but for dropping seed in hills one at or near each end of the axle will be sufficient. Underneath the seed-boxes E there are secured tubes F, which are fixed or permanent, and have their outer or rear sides composed of a series of vertical wires or rods, to form a grating which will retain the seed in the tubes and at the same time admit of seed supports or holders G working in them, the seed supports or holders being composed of curved bars $a$, secured horizontally to the lower end of a vertical rod, $b$. The rods $b$ are fitted in sockets $c$, which are attached to bent levers H, the fulcrum-pins of which are fixtures connected therewith. (See Figs. 4 and 5.) The levers H also have arms $e$ at their outer fitted in bearing attached to the seed-boxes or parts, the ends of said arms being bent upward to form a hook or lip, $f$, to serve as a stop and prevent the seed supports or holders G being drawn out from the tubes F. (See Fig. 4.)

I represents seed-plates, which work directly over the tubes F, between them and the seed-boxes E. These seed-plates are also attached to bent levers J, as shown in Figs. 4 and 5, and the bent levers H J of the two seed-boxes are connected by rods K. These rods K, at one end, are connected to springs L, which have a tendency to keep the plates I underneath the seed-boxes and prevent seed from being discharged into the tubes F, and also to keep the seed supports or holders G in the tubes F. The rod K of the bent levers H is connected at one end to a lever, M, which is operated by teeth $g$ at one side of a toothed wheel, N, and the rod K of the lever J is connected to a lever, O, similar to M, and which is operated by teeth $h$, also on wheel N. The teeth $g\ h$ are so arranged on wheel N that the plates I and holders G will be operated alternately, the plates I, when drawn outward from underneath the seed-boxes, allowing the seed to drop into the tubes F, which seed is retained by the holders G, and the latter, when the plates I are thrown underneath the seed-boxes, by the spring L connected with them, are drawn outward to allow of the discharge of the seed from the tubes F.

The capacity of the tubes F may be varied, as desired, by adjusting the holders G higher or lower in said tubes, which is done by moving the rods $b$ in the sockets $c$ and securing them at the desired point by a set-screw, $i$. By this means more or less grains of corn may be dropped in the hills, as required. The wheel N has its axis in a pendent lever, P, the lower end of which is connected by a link, $j$, with a crank, $k$, on a shaft, Q. By this arrangement the wheel N may be thrown in and out of gear with a wheel, R, on the hub of one of the wheels B, and the seed-distributing device rendered operative or inoperative when desired. The seed is discharged from the tubes F into adjustable tubes S, which work on pivots $l$, in order to admit of the space between the rows being made of greater or less width, as may be desired—a result obtained by adjusting the tubes S on their pivots.

The furrows to receive the seed are made by furrow-openers T, attached to frames U, the front ends of which are connected by joints to pendants m, secured to a cross-bar, V, attached to the thills.

At the rear of each frame U, and in line with the furrow-openers T, there are attached coverers W, the same being composed of two flaring plates, n n, and a vertical plate, o, at their rear, to serve to press down and compact the earth upon the seed. These frames U may be raised and the furrow-openers T elevated free from the ground by having the rear of frames U connected by chains p to arms q extending from the shaft Q. The wheel N is also provided with teeth r, which actuate the lever X, the lower end of which is connected to a spring or elastic arm, Y, which serves as a knocker, to act against the lower part of the seed-box. This arm Y is connected by a rod, s, with a similar arm, Y', which acts against the other seed-box. These knockers effectually prevent the seed-boxes from becoming choked or clogged.

I claim as new and desire to secure by Letters Patent—

1. The tubes F, provided with vertical rods or a grating at their outer or rear sides, in connection with the adjustable seed retainers or holders G, arranged to operate substantially as and for the purpose set forth.

2. The plates I, in combination with the seed retainers or holders G, all arrange to operate conjointly, substantially as described.

3. The wheel N, provided with teeth $g\ h\ r$ at one side, and arranged, as shown, so as to be readily thrown in and out of gear with the wheel R, in combination with the levers M O X, for operating the plates I, seed retainers or holders G, and knockers Y Y', for the purposes set forth.

4. The frames U, suspended by the pendants m, in combination with the furrow-openers T and adjustable coverers, consisting of the flaring plates n and plate o, arranged to operate in the manner and for the objects specified.

ROBERT BURNS.

Witnesses:
M. M. LIVINGSTON,
C. L. TOPLIFF.